United States Patent

[11] 3,577,153

[72] Inventors Motoi Yagi
Zushi-shi;
Yasuo Takemura, Kawasaki-shi, Japan
[21] Appl. No. 753,638
[22] Filed Aug. 19, 1968
[45] Patented May 4, 1971
[73] Assignee Tokyo Shibaura Electric Co., Ltd.
Kawasaki-shi, Japan
[32] Priority Aug. 23, 1967, Jan. 18, 1968
[33] Japan
[31] 53768/67, 53767/67, 71998/67 and
2337/68

[54] IMAGE PICKUP APPARATUS
8 Claims, 12 Drawing Figs.

[52] U.S. Cl. .......... 178/7.2, 178/6.8, 178/(Digest) 1
[51] Int. Cl. .......... H04n 7/18, H04n 5/30
[50] Field of Search .......... 178/6, 6.8, 7.2, 7.2 (D), 6 (IND); 340/258

[56] References Cited
UNITED STATES PATENTS

| | | | |
|---|---|---|---|
| 3,300,770 | 1/1967 | Brousseau et al. | 340/280 |
| 2,610,246 | 9/1952 | Goldsmith | 178/7.2 |
| 2,996,946 | 8/1961 | Brendholdt | 178/7.2 |
| 3,151,268 | 9/1964 | Glark et al. | 178/7.2 |
| 3,275,744 | 9/1966 | Dietrich | 178/6 |
| 3,305,633 | 2/1967 | Chernoch | 178/6.8 |
| 3,390,229 | 6/1968 | Williams | 178/6 |
| 3,467,773 | 9/1969 | Heckman, Jr. | 178/7.2 |

*Primary Examiner*—Robert L. Richardson
*Attorney*—Stephen H. Frishauf

ABSTRACT: A position detector detects the presence of a travelling foreground subject and then enables a light projector, such as a Strobo tube, to provide short duration flashes when the foreground subject is at an optimum predetermined position relative to the position of the light projector. A photoelectric conversion device is provided to pick up an image of the illuminated foreground subject, signals corresponding to the picked up image being processed and, if desired, stored to provide a permanent record.

MOTOI YAGI &
BY YASUO TAKENURA,
INVENTORS
by Stephen [illegible] Atty.

BY

INVENTOR.

BY

INVENTOR.

IMAGE PICKUP APPARATUS

The present invention relates to an improved image pickup apparatus using flash illumination and more particularly to an image pickup apparatus wherein flashes are projected on a foreground subject, the illuminated subject picked up by a photoelectric conversion device capable of storing the image signals obtained and wherein the stored image signals are further processed.

The known photoelectric conversion devices having a photoelectric conversion plane capable of storing picked up images, namely, an image pickup apparatus including an image pickup tube, was generally handicapped in that where a series of different foreground subjects were continuously picked up or where a rapidly travelling foreground subject was picked up, the image produced on the screen became indistinct due to the appearance of residual images on the photoelectric conversion plane of the image pickup tube.

To resolve such shortcomings, there has been proposed an image pickup system which consisted in disposing a slitted rotary disc located in front of the lens of the image pickup tube, and causing the rotary disc to be rotated synchronous with the vertical scanning frequency of the image pickup system, thereby picking up images by allowing light to be intermittently introduced into the image pickup tube.

With such a system, however, the shorter the shutter time, the more intense illumination was required. Necessary additions of mechanical parts resulted in a complicated and bulky control means, and it was impossible to assure exact synchronous rotation of the rotary disc. Accordingly, the aforesaid image pickup system failed to be put to practical use. It was further handicapped by the fact that since the shutter slit was operated in the vicinity of the image pickup plane as in the focal plane shutter of an ordinary photographic camera, the photoelectric plane was exposed gradually to the illuminated light from its one side, so that where a quickly moving subject was picked up, the image on the screen was unavoidably subject to undesirable deformation.

On the other hand, demand has recently grown for development of apparatus whereby articles of extremely great value, such as registered mails or securities, carried, for example, by a conveyor belt, can be unfailingly identified if they should be lost later, or if doubt should arise regarding the actual existence of particular documents among them. Consequently it has become necessary to provide a practical apparatus capable of photoelectrically picking up an article carried by a belt conveyor, properly processing, for example, by recording the picked up image thereof and, if required, reproducing it for subsequent visual confirmation.

It is accordingly the primary object of the present invention to provide an image pickup apparatus which can photoelectrically pick up an article, namely, a foreground subject without the fading of its image and which can properly handle the image signal for a prescribed object.

Another object of the invention is to provide an image pickup apparatus capable of obtaining a reproduced image from a recording device.

Another object of the invention is to provide an image pickup apparatus capable of obtaining an image signal free from the effect of residual images, even when a series of travelling foreground subjects are continuously picked up.

Another object of the invention is to provide an image pickup apparatus capable of obtaining a perfect image signal for each image simply by projecting a single flash illumination on a foreground subject.

Still another object of the invention is to provide an image pickup apparatus capable of obtaining a plurality of duplicate image signals from the same foreground subject by flash illumination.

A further object of the invention is to provide an image pickup apparatus capable of obtaining an image signal exactly proportionate to the gradation of brightness of a foreground subject.

A further object of the invention is to provide an image pickup apparatus capable of distinctly picking up a moving foreground subject without the displacement of the image.

A still further object of the invention is to provide an image pickup apparatus capable of distinctly picking up a moving foreground subject and obtaining a perfect image signal for each image by a single flash illumination.

According to this invention, these objects can be attained by providing an image pickup apparatus comprising means for projecting flash illumination on a foreground subject, a photoelectric conversion device for picking up the foreground subject illuminated by said means and storing the image signal obtained and means for properly processing the image signal issued by said device. Further provided is a position detector for detecting the position of a moving foreground subject and means for energizing the projecting means when the foreground subject is located at a predetermined desired position.

The objects and features of the present invention will be more apparent to those skilled in the art from the specification and preferred embodiments taken with the appended drawings, in which.

Figure 1:
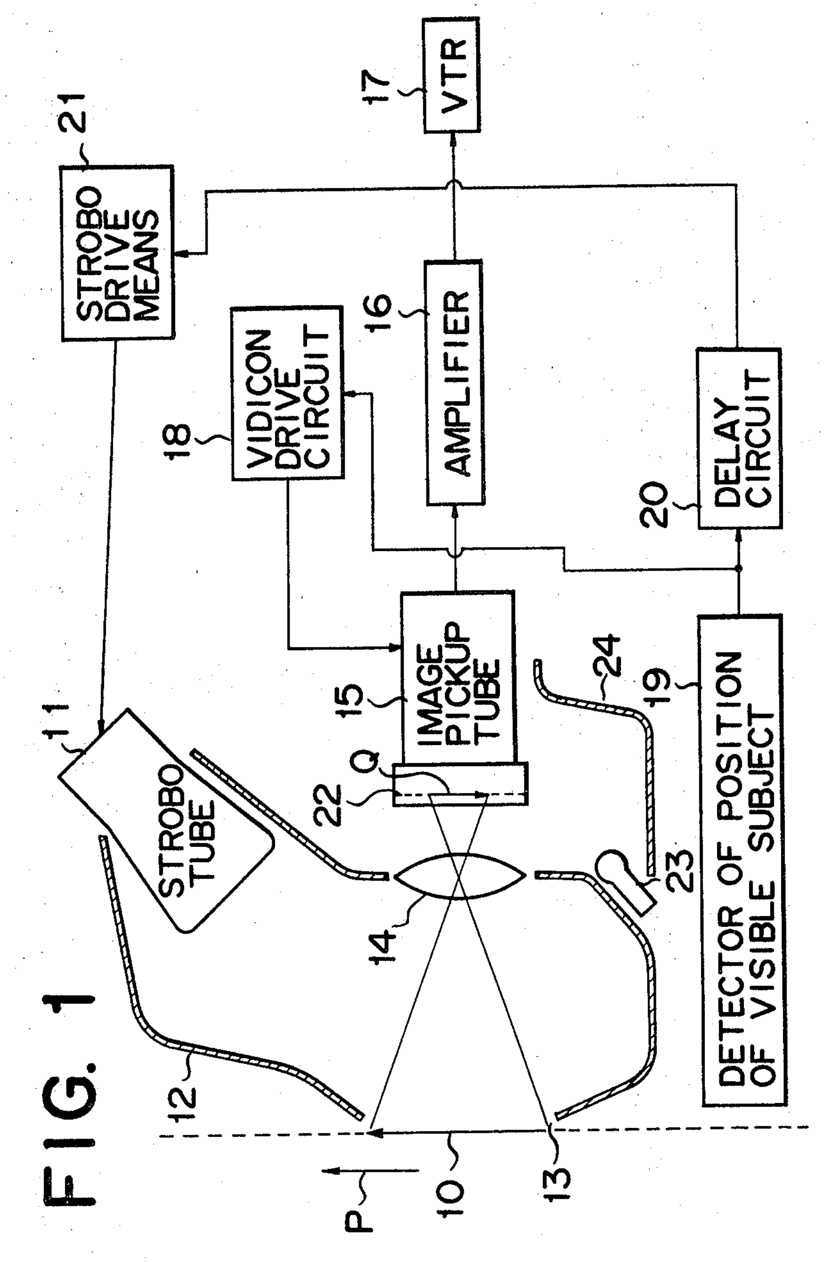
FIG. 1 is a block diagram schematically showing an image pickup apparatus of the present invention.

Referring to FIG. 1, the travelling foreground subject 10 is an article such as a piece of registered mail which should never be allowed to be lost. It is transported by a belt conveyor (not shown) in the direction indicated by the arrow P. Adjacent one end of a hood 12 is disposed a Strobo tube 11 which illuminates the moving foreground subject 10 for an instant, for example, for 100 microseconds. The Strobo tube 11 may be replaced by a discharge tube such as a xenon tube. The hood 12 has an opening 13 provided on the side close to the route of the travelling foreground subject 10 in such a manner that any light from external sources other than the Strobo tube 11 is prevented from being introduced on the subject 10.

In a plane opposite to the opening 13 of the hood 12 is disposed an image pickup lens 14. At a point sufficiently spaced from the lens 14 to cause the image of the foreground subject 10 to be focused therethrough is positioned a photoconductive image pickup tube, for example, a vidicon 15 which includes a photoelectric conversion device. The vidicon 15 has generally a photoelectric conversion plane 22 including $Sb_2S_3$, but it may be replaced by a PbO vidicon, a CdSe vidicon or an image orthicon. To the output terminal of the vidicon 15 is connected a magnetic recording device 17 (hereinafter referred to as VTR Video tape recorder) through an amplifier 16. To the vidicon 15 is also connected a vidicon drive circuit 18 including a power source to drive it and a synchronizing signal generating circuit for vertical and horizontal scanning. There is further provided a means 19 for detecting the position of the foreground subject 10. This detecting means 19 is connected to the vidicon drive circuit 18 and supplies an output signal to the drive circuit 18. The detecting means 19 is also connected through a delay circuit 20 to a Strobo drive means 21. The Strobo drive means 21 is connected to the Strobo tube 11, and the signal from the detecting means 19, delayed for a prescribed length of time, is used as an input to the Strobo drive means 21 thereby to cause the Strobo tube 11 to send forth flashes. Outside of the hood 12 is positioned a source of light 23, for example, an incandescent lamp to project uniform bias illumination on the photoelectric conversion plane 22. The source of light 23 is surrounded by a light screen 24. Thus is constructed the image pickup apparatus of the present invention.

Figure 2:
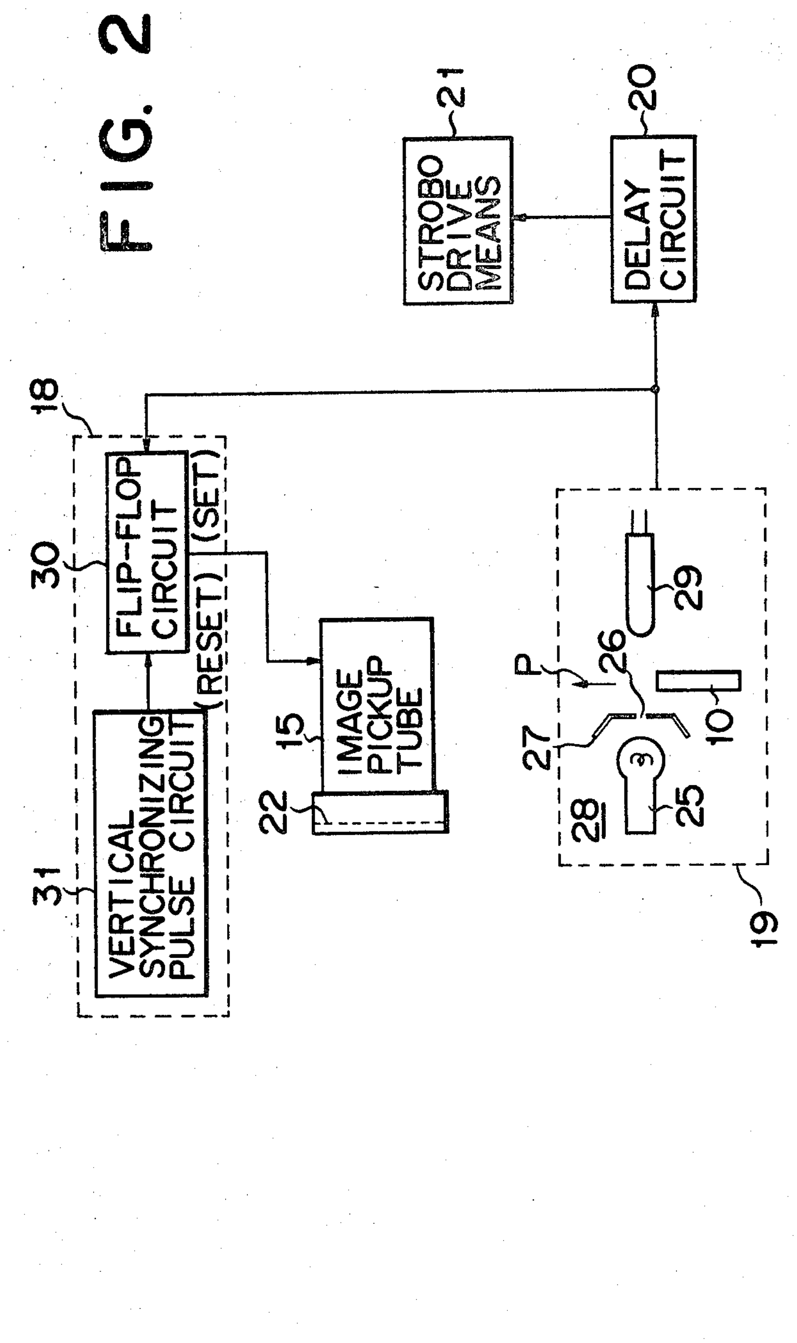
FIG. 2 is a block diagram indicating the details of a means for detecting the position of a foreground subject and vidicon drive circuit included in the image pickup apparatus of FIG. 1.

As shown in FIG. 2, the detecting means 19 consists of a light source member 28 comprising an incandescent lamp 25 and light screen 27 provided with a slit 26 and a light receiving member 29, for example, a phototransistor or solar cell, positioned opposite the lamp 25. The foreground subject 10 is allowed to travel between the lamp 25 and light receiving member 29 in the direction indicated by the arrow P. The output signal from the light receiving member 29 is carried to the delay circuit 20 and also branched to the flip-flop circuit 30 of the vidicon drive circuit 21. To the flip-flop circuit 30 is connected a vertical synchronizing pulse circuit 31 to supply a vertical synchronizing signal thereto, thus constituting the vidicon drive circuit 18.

There will now be described the image pickup apparatus of the present invention. The vidicon 15 is operated at a vertical scanning frequency of, for example, 60 Hz. and a horizontal scanning frequency of, for example, 15.75 kHz. On the other hand, the Strobo tube sends forth instantaneous flashes for a moment of duration of 100 microseconds max., which is an extremely short duration compared to the period required to carry out, scanning involving only one or two scanning lines. Let it be assumed that there is obtained an image of 10 fields per second. Then the Strobo tube 11 is only required to project a flash illumination once for every 6 fields. Where a stationary foreground subject is to be picked up as in the later described embodiment, if the Strobo tube 11 sends forth flashes during the vertical blanking period of scanning electron beams, then there will be obtained a perfect image in the following first field period. However, where a series of rapidly travelling foreground subjects 10 are to be picked up as in this embodiment, it is difficult to control pickup timing so as to cause these foreground subjects 10, which are brought to the image pickup tube in rapid succession, to be located at the desired pickup position exactly during the vertical blanking period of scanning electron beams. Therefore if the introduction of electron beams is obstructed for a certain length of time before taking out (or generating) the image pickup signal and a foreground subject 10 is only illuminated during such obstruction of electron beams, then it will be possible to pick up the foreground subject 10 when it is brought to an optimum position.

Figures 3A, 3B, 3C, 3D:
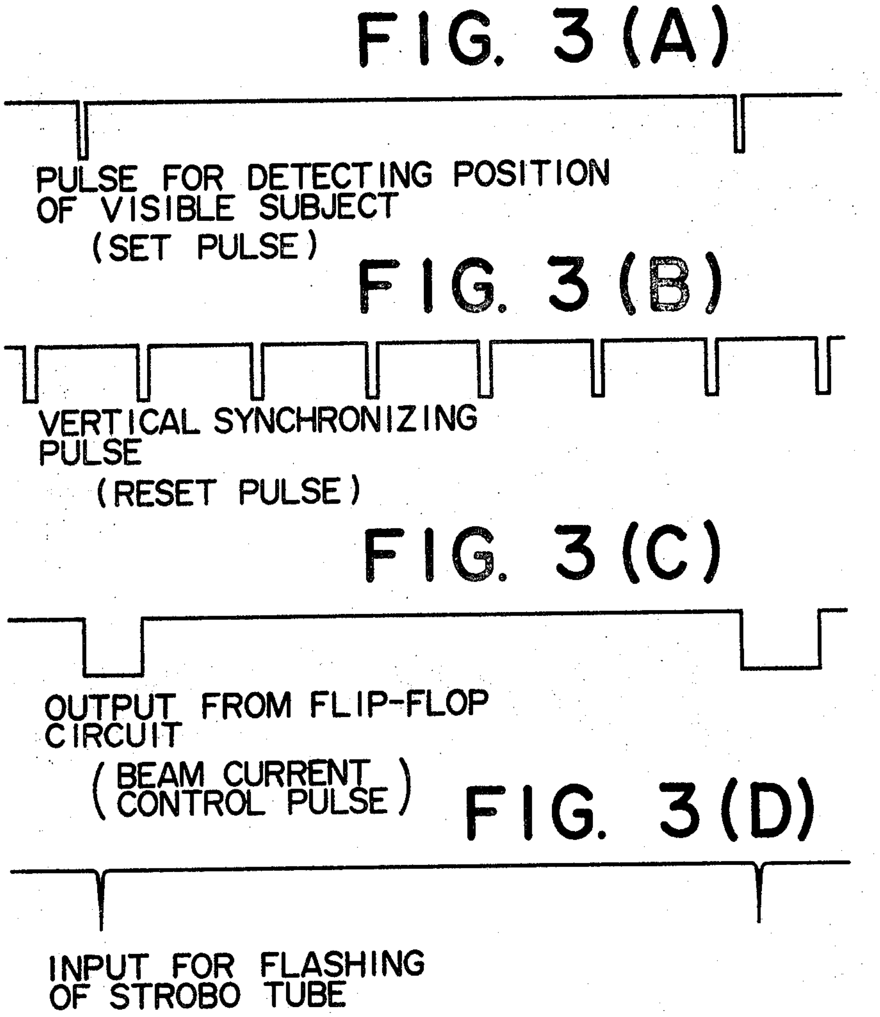
FIGS. 3A to 3E represent waveforms illustrative of the operation of the image pickup apparatus of FIG. 1.
Figure 3E:
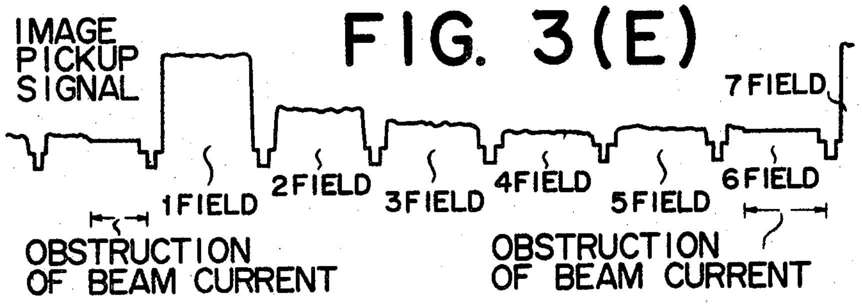

There will now be described the case where image pickup is to be carried out on foreground subjects 10 travelling at a high speed, such as 10 sheets per second. When a foreground subject 10 passes through the position detecting means 19 of FIG. 2, the light from the source 28 is obstructed by the foreground subject 10, and there is obtained from the light receiving member 29 an output signal represented by FIG. 3A. This output signal acts as a trigger signal and is carried through the delay circuit 20 to the Strobo drive means 21 so as to cause the Strobo tube 11 to send forth flashes when the foreground subject 10 is brought to the most suitable point in the field of vision of the vidicon 15. A part of the trigger signal is also used as a setting for the flip-flop circuit 30. On the other hand, as shown in FIG. 3B, the flip-flop circuit 30 is reset by the vertical synchronizing pulses from the vertical synchronizing pulse circuit 31 which is initially supplied to the flip-flop circuit 30 after the arrival of the aforesaid setting pulse. Then the flip-flop circuit issues an output signal having the waveform shown in FIG. 3C. This signal is employed to control the electron beam current of the vidicon 15. Upon receipt of the foreground subject detecting pulse (FIG. 3A), namely, a signal indicating the arrival of a foreground subject 10, the flip-flop output signal obstructs the influx of the electron beam current thereby rendering the photoelectric conversion plane 22 of the vidicon 15 ready for exposure to light at any time. Due to the provision of the delay circuit 20, the Strobo tube 11 is caused to flash slightly later, for example, as shown in FIG. 3D. Thus the optical image Q of the foreground subject 10 which has passed to the field of view of the lens 14 is concentrated on the photoelectric conversion plane 22, and thereafter the flip-flop circuit 30 is reset. Next time when the vertical synchronizing pulse of FIG. 3B is introduced, the vidicon 15 will again be energized to provide an electron beam current thereby to cause an image signal of FIG. 3E to be issued in the following field period from the photoelectric conversion plane 22 of the vidicon 15 which has stored the image Q. As shown in FIG. 3, the foreground subject is illuminated while the electron beam current is obstructed, so that there is obtained a perfect static image in the following first field. The electron beam scanning of the photoelectric conversion plane 22 of the vidicon 15 during the second and subsequent field periods is used in eliminating residual images. This scanning is continued over several field periods until another foreground subject is brought to the image pickup apparatus. Since all the residual images on the photoelectric conversion plane 22 are completely removed, the vidicon 15 is ready for the next image pickup operation. Thus the image signal of the first field is issued by the vidicon 15. This output signal is amplified by the amplifier 16 and recorded by the magnetic recording device VTR 17 one scene after another. If a later visual confirmation is required, the image is reproduced as a static image by means of recording device 17.

In summary, when the position of the foreground subject 10 is detected the electron beams from the vidicon 15 are shut off. When the foreground subject 10 is brought to the opening 13 of the hood 12, namely, to a prescribed position in the field of vision of the vidicon 15, the Strobo tube 11 is allowed to send forth short duration flashes. Thereafter electron beams are caused to be issued by the vidicon 15 during the image plane scanning period following the blanking pulse of the initially introduced vertical synchronizing signal, thereby to obtain an image signal of the first field.

In the aforementioned embodiment, the image signal from the vidicon 15 is recorded in the magnetic recording device VTR 17. However, the signal may be recorded by other recording means such as a magnetic sheet, magnetic disc or photographic film. It may also be supplied to a signal processing means, for example, an electronic computer, or used in identifying the patterns of various foreground subjects. Thus it is possible to classify foreground subjects by picking up the numbers attached thereto and introducing the output signals thereof into a processing device. Further, foreground subjects, for example, photographic films bearing various patterns may be rolled into a cylindrical form, and photoelectrically picked up by flash illumination after confirming that a desired pattern has been brought into the field of vision of the image pickup tube. When the image signal is supplied to an illuminating body, for example, a flying spot tube, there will be obtained a desired image of the aforementioned foreground subject on the sensitized paper disposed adjacent to the illuminating body.

Figure 4A:
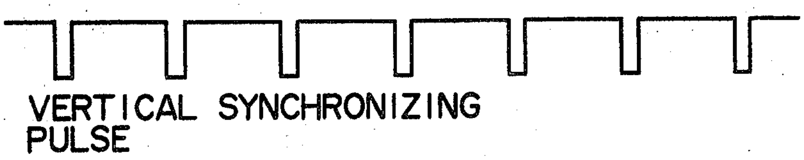
FIGS. 4A to 4C show waveforms illustrative of the operation of another embodiment of the apparatus of FIG. 1.

When a foreground subject 10 is not travelling there is no need, as in the aforesaid embodiment, to obstruct the electron beams from the vidicon 15 by a signal for detecting the position of a foreground subject in order to prepare for flash illumination. Namely, it is only required to connect the Strobo drive means 21 to the vidicon drive circuit 18 in such a manner that there is introduced a vertical synchronizing pulse as shown in FIG. 4A from the output terminal of said circuit.

Figure 4B:
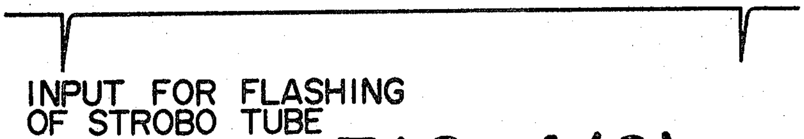
Figure 4C:
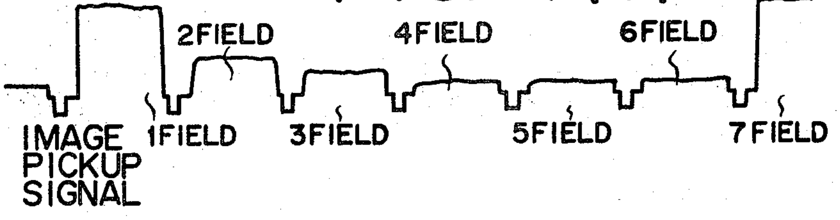

When, in the embodiment for picking up a stationary foreground subject, the Strobo tube 11 is arranged to send forth flashes as shown in FIG. 4B during the blanking period of the vertical synchronizing pulse from the vidicon 18, then there will be obtained a perfect image as shown in FIG. 4C during the initial field period after the illumination of the Strobo tube 11. As in the preceding embodiment, the following step consists in eliminating residual images by scanning the image plane with succeeding electron beams.

If the image signal thus obtained should be deformed due to, for example, noise, there could not be produced an accurate signal. Also, where a travelling foreground subject 10 is picked up it is impossible to pick it up again once it has passed the image pickup tube. Consequently it has become necessary to procure signals representing a plurality of duplicate images by a single pickup operation in order that if the one of the signals should be deformed it may be replaced by an accurate image signal associated with the remainder of the duplicate signals.

There will now be described an embodiment devised to meet such a requirement. In this case the vidicon is operated, for example, at a vertical scanning frequency of 60 Hz., 2:1 interlace, and a horizontal scanning frequency of 15.75 kHz. The Strobo tube 11 sends forth flashes for 100 microseconds max., an extremely short period compared to the time required to carry out scanning only involving one or two scanning lines. Therefore, if it is desired to pick up an image of 6 fields per second it will be sufficient for the Strobo tube 11 to project instant flash illumination for every 10 fields.

When a rapidly travelling foreground subject 10 is brought to a prescribed position in the field of vision of the vidicon 15 during the vertical blanking period and the Strobo tube 11 is caused to send forth flashes to illuminate the foreground subject, then the entire photoelectric conversion plane 22 of the vidicon 15 is exposed to light at the same time. When the photoelectric conversion plane 22 is scanned by electron beams there should be obtained an image signal. However, for the aforesaid particular object, the area of the photoelectric conversion plane scanned by electron beams is reduced to such an extent that the adjacent scanning lines are spaced from each other at a distance about equivalent to the width of one scanning line. With such an arrangement, even when the first field is scanned there is still left over substantially one-half of the scanning area for the charge images stored in the photoelectric conversion plane. Thus, the scanning of the following interlace field (second field) processes just the remaining portion of the stored charge images, obtaining substantially the same image as that of the first field. Strictly speaking, the first and second fields only differ in the scanning area by the width of one scanning line. However, since this difference is substantially negligible, it can be safely said that a single illumination of the Strobo tube 11 produces two identical images.

The scanning of the interlace field by the displacement of a single scanning line is a known technique practiced in standard television image pickup systems, and a detailed description thereof is omitted.

Figure 5A:
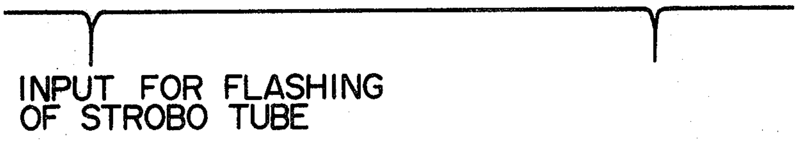
FIGS. 5A and 5B indicate waveforms illustrative of the operation of still another embodiment of the apparatus of FIG. 1.
Figure 5B:
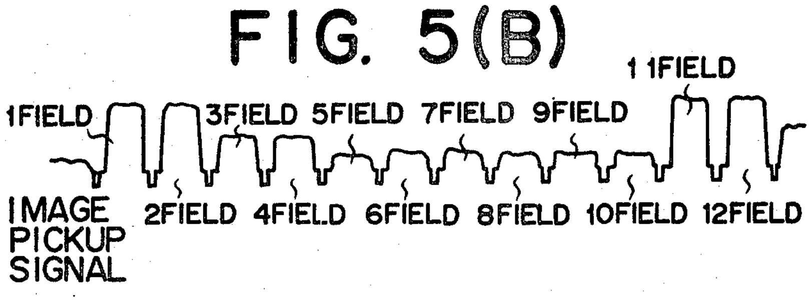

After two identical images are obtained, there is carried out further scanning by electron beams of several succeeding fields in order completely to eliminate charge images still remaining at the time of the second scanning. It is experimentally found that when the same image is scanned three times the residual images can be reduced to less than 20 percent of what was initially present. Therefore the image signals thus obtained can produce a perfect image in the first and second fields as shown in FIG. 5B, using the Strobo illumination of FIG. 5A. The electron beam scanning performed during the third to 10th field period can substantially eliminate the residual images. This means that the same part of the image is scanned five times. During the second vertical blanking period following the 10th field, the Strobo tube 11 again sends forth flashes, obtaining the succeeding substantially duplicate images during the 11th and 12th field periods. This process enables two consecutive static images of a rapidly travelling foreground subject 10 to be obtained without fading. The output signals of the vidicon 15 thus produced are amplified by the amplifier 16 and are then recorded in a magnetic recording means VTR 17.

The foregoing description relates to the case where two duplicate images are obtained by a single pickup operation involving 2:1 interlaced scanning. However, it is also possible to produce three duplicate images by a single pickup operation involving 3:1 interlaced scanning with the electron beam scanned area reduced to one-third of the distance between the scanning lines.

Where a foreground subject 10 having a given type of gradation is picked up by continuous illumination, there is obtained an output signal from the vidicon 15 whose intensity is proportional to said gradation, thus producing an image distinctly graded from the white to the black level. However, where the Strobo illumination is used as in the apparatus of the present invention, there occurs the drawback that the gradations in the vicinity of the black level can not be clearly distinguished. If in this case, the intensity of the Strobo illumination is elevated, it will only result in the increased amplitude of each gradation. Namely, it will be impossible not only to distinguish the gradations near the black level but also to produce an image having a more satisfactory gradation pattern due to the saturation of gradations particularly around the white level. This is due to the fact that with respect to the area close to the black level, the photoelectric conversion plane 22 of the vidicon 15 can not be fully energized by instantaneous illumination.

Accordingly the image pickup apparatus of the present invention is provided with a source of light 23 for the aforementioned bias lighting. The photoelectric conversion plane 22 of the vidicon 15 is exposed to light uniformly and continuously or intermittently at a proper interval, that is, with a luminosity approximating that which is sufficient to obtain an image output signal. When a foreground subject is picked up under such conditions, the photoelectric conversion plane 22 of the vidicon 15 is exposed to the overlapped lights of both the Strobo flashes and the bias lighting. Since the photoelectric conversion plane 22 receives light in the vicinity of the black level, there is obtained an image signal proportional to the gradation of the foreground subject 10. The aforesaid bias lighting may be alternatively implemented by applying a part of the Strobo illumination only to the photoelectric conversion plane 22 of the vidicon 15 by means of an optical system.

We claim:

1. An image pickup apparatus comprising:
means for detecting the position of a travelling foreground subject and for generating a corresponding signal;
means for projecting short duration light flashes on said foreground subject;
delay means for delaying the signal generated by said position detecting means and for enabling said light projecting means a predetermined time after detection of said travelling foreground subject, to thereby project said light flashes when said travelling foreground subject is located at a predetermined position;
photoelectric means for picking up an image of said foreground subject illuminated by light flashes and for storing the picked up image; and
output utilization means coupled to said photoelectric means and responsive to the output thereof which corresponds to said picked up image.

2. Apparatus according to claim 1 wherein said output utilization means includes a magnetic recording device for recording signals corresponding to said picked up image.

3. Apparatus according to claim 1 comprising a source of horizontal and vertical synchronizing signals, the vertical synchronizing signal including blanking periods, and wherein said photoelectric means includes a photoelectric conversion plane and means for scanning said photoelectric conversion plane by electron beams under control of said synchronizing signals.

4. Apparatus according to claim 3 wherein said photoelectric means further includes means responsive to said position detecting means for temporarily applying electron beams prior to the enabling of said light projecting means.

5. Apparatus according to claim 3 wherein said scanning means further comprises means for continuing the electron beam scanning after a picked up image signal has been taken out so as to eliminate the residual images on said plane.

6. Apparatus according to claim 3 wherein said scanning means includes means for scanning said plane in a vertical as well as horizontal direction thereof by the electron beams, and means for enabling said light projecting means to project light flashes during the blanking period of the vertical synchronizing signal.

7. Apparatus according to claim 3 wherein said scanning means includes means for applying interlaced electron beam scanning to said plane.

8. Apparatus according to claim 3 wherein said photoelectric means further comprises biasing light means for projecting light uniformly on said plane.